(12) United States Patent
Moulsley et al.

(10) Patent No.: US 6,785,548 B2
(45) Date of Patent: Aug. 31, 2004

(54) METHOD AND SYSTEM FOR RANDOM ACCESS PACKET CHANNEL REQUEST

(75) Inventors: Timothy J. Moulsley, Caterham (GB); Bernard Hunt, Red Hill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 556 days.

(21) Appl. No.: 09/814,382

(22) Filed: Mar. 21, 2001

(65) Prior Publication Data

US 2001/0027105 A1 Oct. 4, 2001

(30) Foreign Application Priority Data

Mar. 28, 2000 (GB) .............................................. 0007337

(51) Int. Cl.[7] .......................... H04Q 7/20; H04L 12/413
(52) U.S. Cl. ................. 455/450; 455/452.1; 455/452.2; 455/453; 370/447
(58) Field of Search .............................. 455/410, 411, 455/452.1, 452.2, 453, 454, 507, 509, 515–517; 379/328, 329, 335, 345, 349, 336, 337; 370/461–462, 445, 447, 449

(56) References Cited

U.S. PATENT DOCUMENTS

| | | | | |
|---|---|---|---|---|
| 6,163,533 A | * | 12/2000 | Esmailzadeh et al. | 370/342 |
| 6,259,724 B1 | * | 7/2001 | Esmailzadeh | 375/143 |
| 6,381,229 B1 | * | 4/2002 | Narvinger et al. | 370/328 |
| 6,400,695 B1 | * | 6/2002 | Chuah et al. | 370/310 |
| 6,442,153 B1 | * | 8/2002 | Dahlman et al. | 370/342 |
| 6,535,547 B1 | * | 3/2003 | Lyckeg.ang.rd et al. | 375/145 |
| 6,594,248 B1 | * | 7/2003 | Karna et al. | 370/342 |
| 6,597,675 B1 | * | 7/2003 | Esmailzadeh et al. | 370/335 |
| 6,606,313 B1 | * | 8/2003 | Dahlman et al. | 370/347 |
| 6,611,514 B1 | * | 8/2003 | Moulsley | 370/348 |
| 6,625,138 B2 | * | 9/2003 | Karna et al. | 370/342 |
| 6,643,275 B1 | * | 11/2003 | Gustafsson et al. | 370/328 |

FOREIGN PATENT DOCUMENTS

| | | | |
|---|---|---|---|
| EP | 0993215 A1 | 8/1999 | |
| SE | WO 99/60729 | * 11/1999 | |
| WO | WO9960729 | 5/1999 | |
| WO | WO 99/37114 | * 7/1999 | H04Q/7/38 |
| WO | WO 00/76248 A1 | * 12/2000 | H04Q/7/38 |

OTHER PUBLICATIONS

XP 002027584. Qing Guo and Djamal Zeghlache, PD Sep. 18, 1994, "Aggressive Packet Reservation Multiple Access Using Signatures", IEEE Int'l Symposium on Personal Inddor and Mobile Radio Communications, pp. 1247–1253.*

Quing Guo et al, "Aggressive Packet Reservation Multiple Access Using Signatures", IEEE International Symposium on Personal Indoor and Mobile Radio Communications, Sep. 18, 1994, pp. 1247–1253.

* cited by examiner

*Primary Examiner*—William Trost
*Assistant Examiner*—Meless Zewdu
(74) *Attorney, Agent, or Firm*—Jack D. Slobod

(57) ABSTRACT

A radio communication system has a random access channel for the transmission of data (214) from a secondary station to a primary station. Such a channel is intended for use by secondary stations having data (214) to transmit to a primary station while not actually engaged in a call.

By enabling access requests (202) to be transmitted with a greater range of possible signatures, a much greater number of degrees of freedom is available to a secondary station requesting access to a random access channel. This enables significantly improved efficiency of resource allocation by increasing the amount of information transmitted to the primary station by the access request (202).

13 Claims, 2 Drawing Sheets

METHOD AND SYSTEM FOR RANDOM ACCESS PACKET CHANNEL REQUEST

BACKGROUND OF THE INVENTION

The present invention relates to a radio communication system having a random access channel for transmissions from a secondary station to a primary station, and further relates to primary and secondary stations for use in such a system and to a method of operating such a system. While the present specification describes a system with particular reference to the emerging Universal Mobile Telecommunication System (UMTS), it is to be understood that the techniques described are equally applicable to use in other mobile radio systems. In this specification the term random access packet channel refers to the logical channel on which random access packet transmissions take place, which would typically consist of a number of distinct physical channels.

A random access channel is a normal component of a radio communication system, enabling a Mobile Station (MS) to send short messages to a Base Station (BS). Applications include signalling to the BS when the MS is turned on, sending a packet of data to the BS when the MS may not be engaged in a call, and requesting the BS to allocate a resource for the MS to use.

In a system where mobile stations often have a requirement to send packets of data to the BS when not actually engaged in a call it is advantageous to provide a random access packet channel with similar characteristics to a standard random access channel but intended for the transmission of small and medium sized packets from a MS to the BS.

In an embodiment of a such a scheme developed for UMTS, there are a number of random access packet channels available to a MS. A request for access to a packet channel resource sent by the MS is encoded with one of 16 available signatures. Each signature corresponds to a request for a particular resource required by the MS, for example a channel having a particular bit rate. If a suitable resource is available for use, the BS allocates it to the requesting MS.

A problem with such a scheme is the limited amount of information that can be transferred during the access procedure, because of the limited number of signatures and channels available. This problem reduces the efficiency of resource allocation in the system.

BRIEF SUMMARY OF THE INVENTION

An object of the present invention is to provide a random access packet channel having improved resource allocation.

According to a first aspect of the present invention there is provided a radio communication system having a random access channel for transmissions from a secondary station to a primary station, the secondary station having means for requesting allocation of a random access channel resource by transmission of an access preamble encoded with a first signature selected from a first set of signatures and the primary station having means for receiving the access preamble, for determining the first signature and for transmitting an access acknowledgement encoded with a second signature selected from a second set of signatures indicating whether the requested resource is available, wherein the choice of first signature provides further information regarding the resource allocation request and wherein each signature of the second set corresponds to a plurality of signatures in the first set.

According to a second aspect of the present invention there is provided a primary station for use in a radio communication system having a random access channel for transmissions from a secondary station to the primary station, wherein means are provided for receiving an access preamble transmitted by the secondary station, which preamble is encoded with a first signature selected from a first set of signatures, for determining the first signature, for determining from the access preamble which random access channel resource the secondary station requests to be allocated and for transmitting an access acknowledgement encoded with a second signature selected from a second set of signatures indicating whether the requested resource is available, wherein the choice of first signature provides further information regarding the resource allocation request and wherein each signature of the second set corresponds to a plurality of signatures in the first set.

According to a third aspect of the present invention there is provided a secondary station for use in a radio communication system having a random access channel for transmissions to a primary station, wherein means are provided for requesting allocation of a random access channel resource by transmission of an access preamble encoded with a first signature selected from a first set of signatures and for receiving an access acknowledgement encoded with a second signature selected from a second set of signatures indicating whether the requested resource is available, wherein the choice of first signature provides further information regarding the resource allocation request and wherein each signature of the second set corresponds to a plurality of signatures in the first set.

According to a fourth aspect of the present invention there is provided a method of operating a radio communication system having a random access channel for transmissions from a secondary station to a primary station, the method comprising the secondary station requesting allocation of a random access channel resource by transmission of an access preamble encoded with a first signature selected from a first set of signatures and the primary station receiving the access preamble, determining the first signature and transmitting an access acknowledgement encoded with a second signature selected from a second set of signatures indicating whether the requested resource is available, wherein the choice of first signature provides further information regarding the resource allocation request and wherein each signature of the second set corresponds to a plurality of signatures in the first set.

BRIEF DESCRIPTION OF THE DRAWINGS

Embodiments of the present invention will now be described, by way of example, with reference to the accompanying drawings, wherein.

DETAILED DESCRIPTION OF THE INVENTION

Figure 1:
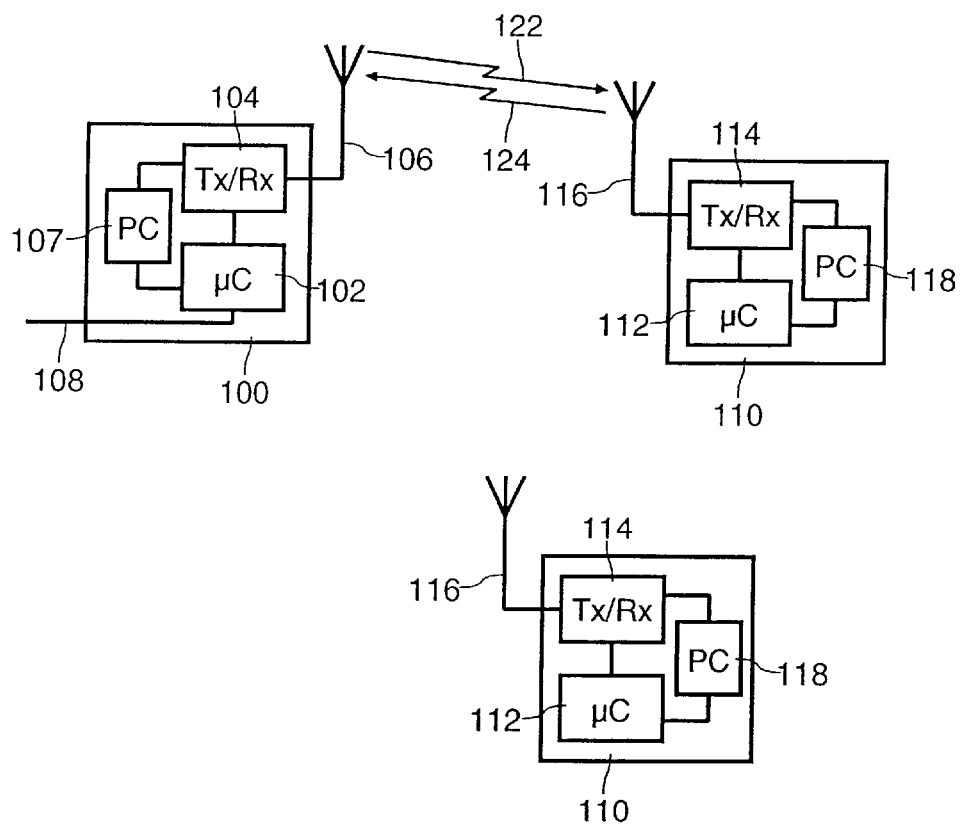
FIG. 1 is a block schematic diagram of a radio communication system.

In the drawings the same reference numerals have been used to indicate corresponding features.

Referring to FIG. 1, a radio communication system comprises a primary station (BS) 100 and a plurality of secondary stations (MS) 110. The BS 100 comprises a microcontroller (μC) 102, transceiver means (Tx/Rx) 104 connected to antenna means 106, power control means (PC) 107 for altering the transmitted power level, and connection means 108 for connection to the PSTN or other suitable network. Each MS 110 comprises a microcontroller (μC) 112, transceiver means (Tx/Rx) 114 connected to antenna means 116, and power control means (PC) 118 for altering the transmitted power level. Communication from BS 100 to MS 110 takes place on a downlink channel 122, while communication from MS 110 to BS 100 takes place on an uplink channel 124.

Figure 2:
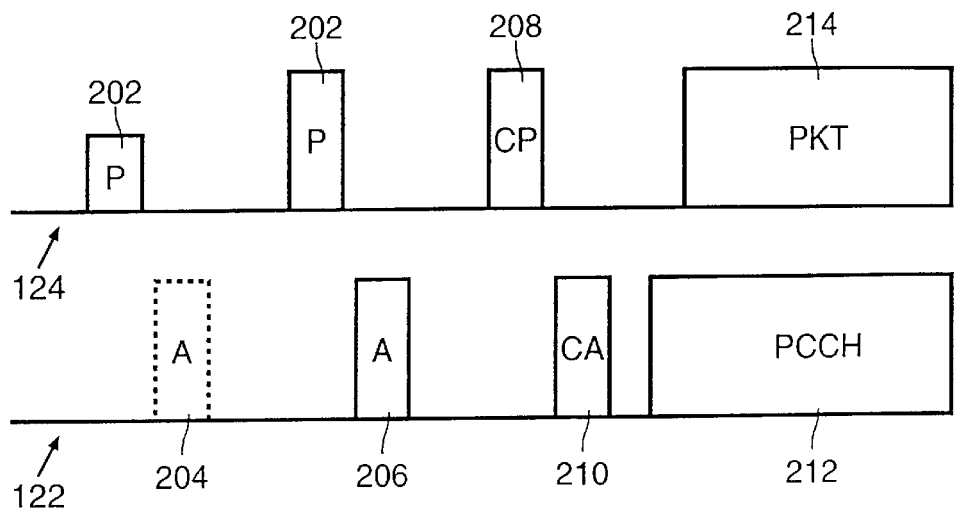
FIG. 2 illustrates a basic random access channel scheme.

A basic scheme for a random access packet channel operating in a frequency division duplex system is shown in FIG. 2, with the uplink channel 124 drawn above the downlink channel 122. In an access phase, the MS 110 first transmits a preamble (P) 202 encoded with one of 16 possible signatures at a low power level in a particular access slot. A signature is a signal characterised by its scrambling code and channelisation code modulated by a specific bit sequence. A mutually orthogonal set of signatures can be obtained by defining a set of mutually orthogonal bit sequences for the modulation. Hence, a different set of signatures can be obtained by changing the scrambling code or the channelisation code (i.e. the physical channel), or by using a different mutually orthogonal set of bit sequences. In the basic system shown in FIG. 2 there is a one to one mapping between the preamble signature and the acknowledgement (206), such that receipt of an acknowledgement by the MS 110 uniquely determines which signature is being acknowledged. Although the present specification refers to sets of 16 signatures, different implementations may use sets having different numbers of signatures.

Each of the available signatures is mapped to a single bit rate for the packet channel. The set of available signatures, and mappings between signatures and bit rates, may be predetermined or may be regularly broadcast by the BS 100. The MS 110 selects a signature for encoding the preamble 202 corresponding to its required bit rate. If there is more than one signature available corresponding to the required bit rate, the MS 110 selects one at random. If the BS 100 receives and decodes the preamble correctly it transmits a preamble acknowledgement (A) 206. In the example shown in FIG. 2, after the first preamble 202 is transmitted no acknowledgement is returned in the slot 204 allocated for it (which might for example be 1 ms in length). The MS 110 therefore transmits another preamble 202 at a higher power level. This is received and decoded by the BS 100, which transmits an acknowledgement 206 and thereby completes the access phase.

As well as informing the MS 110 that its preamble 202 has been received, the acknowledgement 206 may be positive, to signal that the requested resource is available, or negative, to signal that it is in use and access is denied to the MS 110. A negative acknowledgement (NACK) may be indicated by the BS 100 inverting the phase of the signature (with respect to some reference or pilot signal). Alternatively, some of the signatures used by the BS 100 for acknowledgement may also be used as a NACK.

The BS 100 will only transmit one acknowledgement for each access slot, however many preambles 202 were transmitted. One basis for the selection could be to acknowledge the preamble 202 received with the highest power. The initial power level at which a MS 110 transmits the preamble 202 is typically determined by the MS 110 using open loop power control, so that a MS 110 is not at a disadvantage compared to another MS 110 nearer to the BS 100. If more than one preamble 202 was transmitted but each preamble was encoded with a different signature then each MS 110 will know whether or not its preamble 202 was received correctly. However, it is possible that more than one MS 110 selected the same signature, and therefore believes that its preamble 202 has been received. If each of these mobile stations 110 begins to transmit its data the result will be a collision, with none of the data likely to be received correctly.

To reduce the chances of this happening, a contention resolution phase may follow the transmission of an acknowledgement 206 which indicated that the requested resource was available. Each MS 110 which transmitted a preamble 202 encoded with a signature corresponding to that acknowledged by the BS 100 now transmits a further contention resolution preamble (CP) 208. This preamble 208 is encoded with a signature randomly selected from another set of 16 possible signatures. This set may be different from the set used for the access preamble 202 (either by changing the set of modulating bit sequences, the scrambling code or the channelisation code), or alternatively the set of signatures may be shared between access and contention resolution phases. The BS 100 then issues a contention resolution acknowledgement (CA) 210 corresponding to the selected preamble 208, for example that received with the highest power, which acknowledgement 210 enables the MS 110 to transmit its data. Hence, if more than one MS 110 selected the same access preamble 202 the chance of the same contention resolution preamble 208 also being selected is small. A channel assignment message may optionally be transmitted at substantially the same time as the contention resolution acknowledgement 210, or even as part of the acknowledgement 210, as disclosed in our co-pending International patent application PCT/EP00/06988 (our reference PHGB 000003).

After this contention resolution phase the BS 100 begins transmission of a Physical Control CHannel (PCCH) 212, which includes power control information to instruct the MS 110 to adjust its transmission power as necessary, and the MS 110 transmits one or more data packets (PKT) 214 on the allocated packet channel, which is normally on a different physical channel to those used for the preamble transmissions. The PCCH 212 may begin simultaneously with the transmission of the data 214, or may precede it sufficiently for closed loop power control to be established before the data transmission.

A particular problem with the basic scheme described above is that the efficiency of resource allocation is limited by the number of choices available for the access preamble 202. In an embodiment of the scheme for UMTS, for example, there are 16 signatures and 12 random access sub-channels available, giving a total of 196 degrees of freedom.

This problem is solved in a system made in accordance with the present invention by defining a larger set of signatures, which may have low cross correlations rather than strict orthogonality. Such a set of signatures could be defined by modifying the bit sequences used to define the signatures or by using different scrambling codes, or by a combination of both techniques. In order to avoid the need to allocate a larger number of downlink channelisation codes, the same acknowledgement (206) in FIG. 2 may be transmitted in response to any one of a defined set of preamble signatures. This may increase the probability of collisions, but typically this would be an acceptable drawback compared the other advantages of the system.

The availability of many more degrees of freedom enables significantly more efficient resource allocation. For example, in the case of channel assignment it enables there to be more bit rates.

A system made in accordance with the present invention can make use of the much greater number of degrees of freedom in a number of ways. Possible assignments for each combination of signature, channel and (non-zero) timing offset include the following (either singly or in combination):

as a request for a particular bit rate;

as a request for a particular access class (with associated priority);

as a request for additional resources (e.g. a downlink shared channel);

for indicating the priority of the message.

for indicating the length (or minimum or maximum length) of the packet to be sent;

for use by a specific MS 110; and for use by MSs 110 using one of a set of common higher layer messages.

Some of these assignments could reduce the quantity of higher layer information required to be included in the data packet 214. For example, if a particular MS 110 is assigned the exclusive use of a subset of the possible uplink signals, its identity is automatically known by the BS 100 and need not be included in the data packet 214. Such a reduction in overhead on packet transmission could be particularly useful for low data rate applications. The same principle could be applied to other commonly-used items of higher layer information. Other assignments could improve system responsiveness. For example, indicating the minimum length of a packet to be sent enables the BS 100 to send an ARQ (Automatic Repeat reQuest) to the MS 110 if it does not receive at least the indicated minimum length. Indicating the maximum length of a packet may enable the BS 100 to improve its planned resource allocation.

Figure 3:
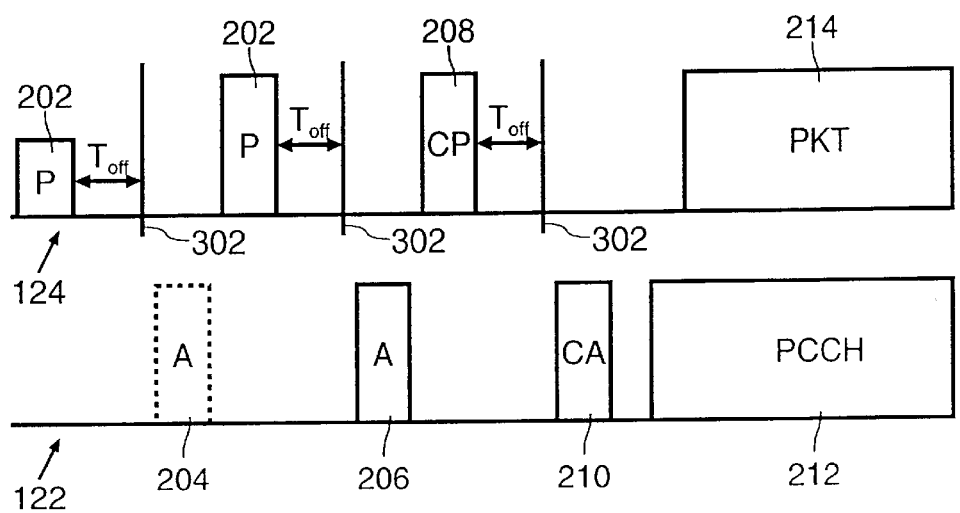
FIG. 3 illustrates an enhanced random access channel scheme in which the transmission time of preamble and contention resolution preambles may be offset.

FIG. 3 illustrates how the set of possible signatures can be extended by introducing different time offsets. The time of transmission of the access preamble 202 may be offset by $T_{off}$ with respect to the boundary 302 of the access slot (which is itself defined relative to timing signals transmitted by the BS 100). The access preamble 202 and contention resolution preamble 208 both comprise 4096 chips, while the length of the access slot is 5120 chips. By allowing timing offsets $T_{off}$ of multiples of 256 chips, up to 19 different non-zero values of $T_{off}$ are possible without introducing ambiguity about which slot contained the preamble 202, 208. When $T_{off}=0$ the behaviour of the system is identical to that of a system without the possibility of timing offsets.

The timing offset $T_{off}$ preferably advances the transmission time of the preambles 202, 208, since any delay in its transmission might mean that the BS 100 is unable to detect the preamble in time to transmit an access acknowledgement 206 in an appropriate time slot.

The timing offset for the contention resolution preamble 208 is preferably the same as that for the access preamble 202, so that the BS 100 can readily identify the two preambles 202, 208 as coming from the same MS 110.

It is preferable for there to be no timing offsets in the downlink channels 122, so that the acknowledgement 206 of an access preamble 202 is the same irrespective of the timing offset used. This enables collisions between offset and non-offset transmissions to be resolved during the contention resolution phase. The use of timing offsets has the further advantage of increasing the number of different signals available for use during the contention resolution phase, thereby reducing the probability of unresolved collisions.

As a variation on the above scheme, the preamble signature could act purely as an identifier for the access attempt, while the information relating to the resource allocation request could be carried by the timing offset and sub-channel selected by the MS 110.

Figure 4:
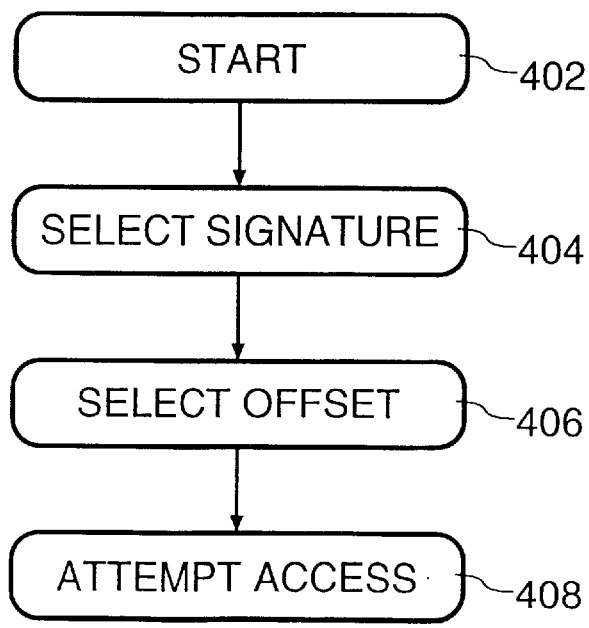
FIG. 4 is a flow chart illustrating a method in accordance with the present invention for attempting to access a random access packet channel using timing offsets.

A flow chart summarising a method in accordance with the present invention, including the use of time offsets, for a MS 110 attempting to access a packet channel resource is shown in FIG. 4. The method starts, at step 402, when the MS 110 has data for transmission on the random access packet channel. The MS 110 firstly, at step 404, selects a signature corresponding to the required resource, for example the required bit rate. Next the MS 110, at step 406, determines an appropriate timing offset $T_{off}$, for example to indicate its identity or the urgency of the data for transmission. Having selected these parameters, the MS 110, at step 408, attempts to access the packet channel by transmitting one or more access preambles 202 and a contention resolution preamble 208, as described above.

In alternative embodiments, not all the features shown in FIG. 3 may be needed. For example, inner loop uplink power control may not be essential, so the PCCH 212 may not be present. The collision resolution part may not be essential, in which case the contention resolution preamble 208 and acknowledgement 210 messages may not be present. The consequences of these changes would be simpler implementation, but at the cost of poorer Eb/No performance and increased collision probability of message parts. In some cases, all the required signalling information may be conveyed by the choice of access sub-channel and signature, in which case the message part would not be needed and could be omitted. As an alternative to selecting the bit rate by reference to the preamble signature, it may be determined by the MS 110 and indicated by signalling in the message part 214.

As well as its application in a FDD system as described above, the present invention could be applied in other types of communication system. For example, it could be used in a Time Division Multiple Access (TDMA) system provided that the uplink transmissions take place in different time slots to the downlink transmissions.

The embodiments described above relate to packet transmission. However, the same principles can equally well be applied to a system in which circuits are set up for data transmission.

From reading the present disclosure, other modifications will be apparent to persons skilled in the art. Such modifications may involve other features which are already known in the design, manufacture and use of radio communication systems and component parts thereof, and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of features during the prosecution of the present application or of any further application derived therefrom.

In the present specification and claims the word "a" or "an" preceding an element does not exclude the presence of a plurality of such elements. Further, the word "comprising" does not exclude the presence of other elements or steps than those listed.

What is claimed is:

1. A radio communication system, comprising:
    a primary station;
    a secondary station;
    a random access channel for transmissions from the secondary station to the primary station;
    wherein the secondary station includes means for requesting allocation of a random access channel resource by transmission of an access preamble encoded with a first signature selected from a first set of signatures; and wherein the primary station includes means for receiving the access preamble, means for determining the first signature, and means for transmitting an access acknowledgement encoded with a second signature selected from a second set of signatures indicating whether the requested resource is available;

wherein the choice of first signature provides further information regarding the resource allocation request; and wherein each signature of the second set corresponds to a plurality of signatures in the first set.

2. The system as claimed in claim 1, wherein not all of the signatures comprising the first set of signatures are mutually orthogonal and wherein any pair of signatures comprised in the first set of signatures have a low cross correlation.

3. A primary station for use in a radio communication system having a random access channel for transmissions from a secondary station to the primary station, the primary station comprising:

means for receiving an access preamble transmitted by the secondary station, which preamble is encoded with a first signature selected from a first set of signatures;

means for determining the first signature;

means for determining from the access preamble which random access channel resource the secondary station requests to be allocated;

means for transmitting an access acknowledgement encoded with a second signature selected from a second set of signatures indicating whether the requested resource is available, wherein the choice of first signature provides further information regarding the resource allocation request; and wherein each signature of the second set corresponds to a plurality of signatures in the first set.

4. The primary station as claimed in claim 3, further comprising means for determining at which of a plurality of available time offsets the access preamble was transmitted, which offset provides further information regarding the resource allocation request.

5. The primary station as claimed in claim 4, further comprising:

means for receiving a contention resolution preamble, transmitted by the secondary station in response to reception of the access acknowledgement;

means for determining at which of the plurality of available time offsets the contention resolution preamble was transmitted; and means for transmitting a contention resolution acknowledgement indicating whether the secondary station has been granted access to the requested resource.

6. A secondary station for use in a radio communication system having a random access channel for transmissions to a primary station, the secondary station comprising:

means for requesting allocation of a random access channel resource by transmission of an access preamble encoded with a first signature selected from a first set of signatures;

means for receiving an access acknowledgement encoded with a second signature selected from a second set of signatures indicating whether the requested resource is available;

wherein the choice of first signature provides further information regarding the resource allocanon request; and wherein each signature of the second set corresponds to a plurality of signatures in the first set.

7. The secondary station as claimed in claim 6, wherein the access preamble is transmitted at one of a plurality of available time offsets, which offset provides further information regarding the resource allocation request.

8. The secondary station as claimed in claim 7, further comprising:

means for receiving an access acknowledgement from the primary station indicating successful reception of the access preamble; and means for transmitting in response a contention resolution preamble at one of the plurality of available time offsets.

9. The secondary station as claimed in claim 8, wherein a use of any one of the plurality of available time offsets results in the transmission of the preamble in advance of the time at which it would be transmitted without the offset.

10. The secondary station as claimed in claim 8, wherein the time offsets used for transmission of the access preamble and contention resolution preamble are the same.

11. A method of operating a radio communication system having a random access channel for transmissions from a secondary station to a primary station, the method comprising:

operating the secondary station to request an allocation of a random access channel resource by transmission of an access preamble encoded with a first signature selected from a first set of signatures;

operating the primary station to receive the access preamble; and determining the first signature and transmitting an access acknowledgement encoded with a second signature selected from a second set of signatures indicating whether the requested resource is available, wherein the choice of first signature provides further information regarding the resource allocation request, and wherein each signature of the second set corresponds to a plurality of signatures in the first set.

12. The method as claimed in claim 11, wherein not all of the signatures comprising the first set of signatures are mutually orthogonal; and wherein any pair of signatures comprised in the first set of signatures have a low cross correlation.

13. The method as claimed in claim 11, wherein the access preamble is transmitted at one of a plurality of available time offsets;

wherein the primary station determines its time offset; and wherein the transmission time offset of the access preamble provides further information regarding the resource allocation request.

* * * * *